United States Patent Office 3,005,841
Patented Oct. 24, 1961

3,005,841
BROMINE-CONTAINING ORGANO PHOSPHATE
Milton Silverman, Modesto, Calif., assignor to Shell Oil Company, New York, N.Y., a corporation of Delaware
No Drawing. Filed May 23, 1960, Ser. No. 30,757
2 Claims. (Cl. 260—461)

This invention is a new organo-phosphorus compound which exhibits a wide spectrum of biological activity.

This new compound is methyl 2,3-dibromo-3-(dimethoxyphosphinyloxy)butyrate of the formula:

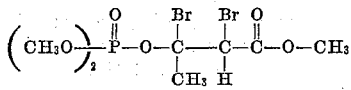

It has been found to be an outstanding fungicide, particularly against soil-borne fungi, and to be a highly active insecticide with extended residual toxicity.

This novel compound can be prepared by any of the methods known in the art for synthesizing compounds of this same general character. One convenient way of preparing the compound is to brominate dimethyl 1-carbomethoxy-1-propen-2-yl phosphate, a compound described in United States Patent No. 2,685,552. This method of preparation is that which was employed in the following example:

EXAMPLE I 43 grams of dimethyl 1-carbomethoxy-1-propen-2-yl phosphate was dissolved in 150 milliliters of methylene dichloride. The solution was well stirred and maintained at 10–15° C. while there was added 30 grams of bromine dissolved in 50 milliliters of methylene dichloride over a period of about one-half hour. The solvent was stripped off at room temperature and 30 millimeters mercury pressure. A 79% yield of methyl 2,3-dibromo-3-(dimethoxyphosphinyloxy)butyrate was obtained. The identity of the product was confirmed by elemental analysis and by infrared spectrum analysis.

This compound has been found to be toxic to insects. By the term "insects" is meant not only the members of the class Insecta, but also related or similar non-vertebrate animal organisms belonging to the allied classes of arthropods and including, for example, mites, ticks, spiders, wood lice, and the like.

The insecticidal properties of this compound can be exploited by the usual methods and techniques employed by the art. A summary of the way in which organo-phosphorus insecticides, including the compound provided by this invention, can be used is set out in United States Patent No. 2,685,552. The concentration of the compounds to be used in the insecticidal compositions is dependent on many factors, including the particular compound utilized, the carrier employed, the method and conditions of application, and the insecticide species to be controlled, a proper consideration and resolution of these factors being within the skill of those versed in the insecticide art. In general, however, the compound of this invention is effective in concentrations of from about 0.001 to 1.0% based upon the total weight of the composition, though under some circumstances as little as about 0.00001% or as much as 5% or even more of the compound can be employed with good results from an insecticidal standpoint, as wherein high concentrations of active material are used in low-volume sprays or dusts.

The insecticidal activity of methyl 2,3-dibromo-3-(dimethoxyphosphinyloxy)butyrate was ascertained as follows:

A solution of the compound was made up employing either a neutral petroleum distillate boiling within the kerosene range or acetone as the solvent. The solution was tested for toxicity against the 2-spotted spider mite, *Tetranychus telarius,* and the pea aphid *Machosiphum pisi,* by spraying groups of plants infested with these insects under controlled conditions which varied from one test to the other only with respect to its concentration. Thus, in each of the several tests, the same total volume of spray was used. Also, tests were carried out using the common housefly, *Musca domestica,* as the test insect, the method used being that described by Y. P. Sun, Journal of Econ. Entomology, volume 43, p. 45 et seq. (1950). Table I shows the concentration of active agent in the sprayed solution required to cause approximately 50 percent mortality of the test insect—i.e., the $LC_{50}$ concentration.

Table I

[Material: Methyl 2,3-dibromo-3-(dimethoxyphosphinyloxy)butyrate]

| Test Insect | Approximate Median Lethal Concentration ($LC_{50}$), g. per 100 ml. solvent |
| --- | --- |
| Pea Aphid | 0.0036 |
| 2-Spotted Spider Mite | 0.0077 |
| Housefly | 0.0115 |

That methyl 2,3-dibromo-3-(dimethoxyphosphinyloxy) butyrate has extended residual insecticidal toxicity was shown as follows:

A solution of the compound in acetone was applied by pipette to a Petri dish, and the acetone was allowed to evaporate. The concentration of the compound in the solution and the amount of solution was controlled to give the desired quantity of the compound per square inch of the surface of the Petri dish. The dishes were held at 80° F. and 50% relative humidity. Adult *Anopheles albimanus* mosquitoes were exposed for one hour to the treated dishes at intervals. At each exposure, then, mosquitoes were used on each of the two replicates. The results obtained were expressed as the average 24-hour mortality counts of the paired replicates. The following results were obtained:

Table II

| Compound | Methyl 2,3-dibromo-3-(dimethoxyphosphinyloxy)-butyrate | Acetone (control) |
| --- | --- | --- |
| Dosage, milligrams of toxicant per square foot of surface | 10 | 50 |
| Average Percent Mortality for One-Hour Exposure at Intervals Indicated: | | |
| Fresh Deposit | 100 | 100 | 0
| One Day | 100 | 100 | 0
| Three Days | 85 | 100 | 0
| Seven Days |  | 100 | 0
| Fourteen Days |  | 90 | 0

Methyl 2,3-dibromo-3-(dimethoxyphosphinyloxy)butyrate also has been found to be an effective fungicide, its fungicidal activity having been shown as follows:

Sugar beet seeds were planted about one-half inch deep in moist sandy loam soil in a series of containers, the soil being contaminated with the fungus, *Pythium ultimum,* as well as other "damping-off" fungi. Emulsions of methyl 2,3-dibromo-3-(dimethoxyphosphinyloxy)butyrate in water, each emulsion containing a different concentration of the butyrate, were applied to the surface of the planted soil in the various containers, the amount of the emulsion applied to the soil in each container being the same, and sufficient to disseminate the butyrate in the soil surrounding the seeds. Readings were made 5 and 10 days after the treatment to determine control of the fungi. It was found that the butyrate provided substantially complete control of the fungi at a concentration of 100 parts by weight per million parts by weight of the soil surrounding the seeds. It was further found that the butyrate was not phytotoxic even at a concentration of 100 parts by weight per million parts by weight of the soil.

In further tests, the butyrate was formulated as coarse dusts, each dust containing a different concentration of the butyrate, and the dusts were thoroughly mixed with well-screened sandy loam field soil contaminated by root rot fungi, principally *Thielaviopsis* and *Rhizoctonia solani*. The treated soil then was placed in containers. Seeds of cotton, peas, sugar beets and beans then were planted in the soil. Readings were made 10 and 21 days after planting to determine the extent of control of the root rot fungi. It was found that the butyrate provided substantially complete control of the fungi at concentrations somewhat less than 200 parts by weight per million parts by weight of the soil, and was not phytotoxic at such concentrations.

In still further tests, the procedure immediately above was repeated, except that the soil was taken from the field, and the treated soil replaced from that point in the field from which the untreated soil was taken. The test crop was peas. The crop was watered and handled in normal "field fashion." Readings were made 3–4 weeks after planting to determine control of root rot. It was found that the butyrate effected substantially complete control of the root rot at a concentration of 50 parts by weight per million parts by weight of soil, and was not phytotoxic at that concentration.

Since methyl 2,3-dibromo-3-(dimethoxyphosphinyloxy)butyrate is not phytotoxic at fungicidally effective concentrations, it may be used for the protection of living plants against the ravages of fungi. It is effective against soil-borne fungi as well as those which do not inhabit the soil.

To destroy fungi, it is necessary to bring the butyrate into contact therewith. Since the butyrate is not volatile at ordinary temperatures, it is most effectively brought into contact with the fungi by the application of sprays, dusts or other formulations containing the butyrate to surfaces of objects to be protected against attack by fungi.

As shown by the tests already set out herein, the butyrate conveniently may be applied as a suspension, dispersion or emulsion in water. Alternatively, the butyrate can be formulated as a solution or suspension in a suitable nonphytotoxic organic solvent, as a dispersion or emulsion in a non-solvent therefor, as an emulsion of a solution thereof in a suitable solvent emulsified with a second, inhomogeneous liquid, or as a solid comprising the butyrate sorbed on a sorptive solid carrier. Where a light hydrocarbon oil is to be used as carrier, suitable materials for the purpose include any of the spray oils marketed commercially for this purpose. The highly aromatic hydrocarbons are preferred.

Although the solvent usually will be of mineral origin, oils of animal or of vegetable origin also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

Solutions of the active agents may be applied as such, or they may be suspended in water and the suspension or emulsion applied. Thus, a relatively concentrated solution of the butyrate in a water-immiscible solvent may be prepared, with added emulsifying, dispersing or other surface-active agents, and the concentrate diluted with water to form a uniform fine emulsion for application.

Minor amounts, for example, about 0.5% by weight to about 10% by weight, of emulsifying agents may be included to promote dispersion of the butyrate in the carrier. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred since the concentrates in which they are present have increased stability and do not suffer phase separation when diluted with hard water. Suitable non-ionic agents which may be used are available commercially as, for example, Triton X–100 and Lissapol N—believed to be condensation products of alkylphenols with ethylene oxide—and Tweens—believed to be condensation products of ethylene oxide and higher fatty acid esters, for example, oleic acid ester of anhydrosorbitols.

Liquid compositions of the butyrate suitable for application contain the butyrate in concentrations generally within the range of from about 0.01% by weight to about 25% by weight.

The butyrate may be absorbed or adsorbed in or on a sorptive carrier, such as finely divided clay, talc, gypsum, lime, wood flour, fuller's earth, kieselguhr, or the like. The solid composition, or dust, may contain from as little as 1% by weight of active material to 50% by weight of active material, or even more. It may be prepared as a dust, or as granules designed to be worked into soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application to soil, the rate of application of the butyrate may be varied from about 0.5 to 100 or more pounds per acre. It will be appreciated that the rate of application is subject to variation according to the fungi involved, the particular species of plants involved, and the local conditions, for example, temperature, humidity, moisture content of the soil, nature of the soil, and the like. Effective resolution of these factors is well within the skill of those well versed in the fungicide art. The butyrate-containing composition can, depending upon its character, be sprayed or dusted upon the surfaces to be protected from fungi, or in the case of application to soils, it can be applied by flooding, by addition to irrigation water, by mixing with the soil, by injection into the soil, or by combination of these techniques.

The butyrate may be the sole biologically active material, or there may be present one or more materials. Thus, when applied to soils, the butyrate may be accompanied by soil conditioners, fertilizers, nematicides or other soil amenders. When applied to plants, there may be included insecticides, plant growth-modifying agents or the like. When used for non-agricultural purposes, other materials may be present. Thus, the butyrate may be included in pastes used in book bindings to prevent mildew and rot, or it may be included with other preservatives such as copper salts, in compositions used for protecting sills and pilings. It is thus apparent that the butyrate can be used in any application where a non-phytotoxic fungicide is required.

Since it is not phytotoxic at fungicidally active concentrations, the butyrate may be applied to the soil at the same time as crop seeds are planted, or it may be applied to soil in which the crop is growing. Of course, it may be applied before the crop is planted, for example, when the soil is being tilled.

In addition to being toxic toward Thielaviopsis, Rhizoctonia and Pythium fungi, the butyrate also is toxic toward such fungi as the Fusarium fungi, *Phytophthora infestans*, *Uromyces fabae*, Verticillium fungi, the various rusts, smuts, scabs, fruit and stem rots, anthracnoses, cankers, molds, mildews, and the like. The butyrate also can be used to control various bacteria, including soil-borne bacteria, bacterial wilts, blights, cankers and the like.

I claim:
1. Methyl 2,3-dibromo-3-(dimethoxyphosphinyloxy)-butyrate.
2. A process for preparing methyl 2,3-dibromo-3-(dimethoxyphosphinyloxy)butyrate which comprises brominating methyl 3-(dimethoxyphosphinyloxy)crotonate.

References Cited in the file of this patent
UNITED STATES PATENTS
2,685,552    Stiles _____ Aug. 3, 1954

OTHER REFERENCES
Lorenz et al.: J. Am. Chem. Soc., 77, 2554–2556 1955).
Allen et al.: J. Am. Chem. Soc., 78, 3715–3718 (1956).